United States Patent Office 3,813,460
Patented May 28, 1974

---

3,813,460
MANUFACTURE OF CONCRETES AND MORTARS
Andre Tardieu, Puymoyen, 16 La Couronne, France
Filed Feb. 9, 1972, Ser. No. 224,842
Claims priority, application France, Feb. 15, 1971,
7105870; Dec. 20, 1971, 7145764
Int. Cl. B28b *1/00*
U.S. Cl. 264—28
5 Claims

ABSTRACT OF THE DISCLOSURE

This invention relates to manufacturing concretes or mortars and is concerned with the problem of storage or transportation of materials of this kind which are made up from a binder, aggregate and water. In accordance with the invention, the mixture of the aforementioned materials in a pasty state is frozen and, after transportation or appropriate length of storage, is thawed out to reconvert the mixture into a pasty state for use.

---

The present invention relates to a method of conditioning concretes and mortars.

Concretes and mortars which are manufactured nowadays using manual or mechanical mixing, have a very limited useful life after tempering, and the setting time does not enable prolonged storage beyond a few hours. Consequently, transport of mixed concretes and mortars cannot be contemplated if the journey is to exceed a few hours and moreover the vibrations inherent in transportation cause compacting of the material which necessitates remixing of the products, adding water, and this causes a reduction in the resistance of the material and loss of time.

Mixer lorries are used to transport concretes and mortars which are of very expensive material and must be capable of transporting large quantities of the material in order to be an economic proposition and earn profit.

It is a primary object of the invention to provide a method of manufacturing good quality concrete or mortar more conveniently and cheaper than heretofore, and also to save on transportation costs.

The invention consists in a method for manufacturing concrete or mortar from a pasty mixture of a binder and aggregate, which is then subjected to a freezing operation so as to enable it to be stored and transported, e.g. in the solid state, whereafter it is thawed to reconvert it to a pasty state for use.

Concretes and mortars which are frozen in accordance with the invention for storage or transportation have numerous advantages such as economies in transport and material, facility of handling, prolonged preservation without losses in their chemical and mechanical qualities, a reduction in the storage space, cleaner and quicker manipulation and moreover it is simpler to transport very variable amounts of the materials.

Due to the ability to store the materials in the frozen state, production may be staggered over the working day which gives the possibility of at least doubling the output of ready-to-use material by the manufacturing plant, because hitherto the plants were larger than really necessary in order to meet peaks in requirements and consequently have operated on an average only at 40% of maximum capacity per working station (8 to 10 hours per day).

By using ordinary platform-loading or refrigerated lorries which can transport the same useful load as a mixer-lorry for half the cost, it is thus possible to effect a saving in transportation costs.

Moreover, the manufacturing plant may be installed at the sand or gravel pit by using the method according to the invention, instead of being set up close to the place where the concrete is to be used and there follows therefrom a further saving in the transportation of aggregates. This advantage is explained by reason of the low operating cost of the ton/km with platform lorries and also by reason of the possibility of transporting the frozen concrete over longer distances.

Another advantage resulting from the invention is that it becomes possible to transport on the same lorry concretes or mortars of different composition at the same time.

Moreover, if there is a delay in use, frozen concrete not used can be sent back to the plant which enables any substantial loss of materials to be avoided.

Furthermore the method according to the invention enables concretes and mortars ready for use to be sold for the "do-it-yourself" market, yet having a quality at least equivalent to the traditional concretes and mortars.

The freezing of concrete and mortar is effected in refrigerating apparatus adapted to receive and handle the product.

The aggregates used may have different sizes and may be formed by different products such as sand, gravel, expanded clay, pozzolana, expanded polystyrene, glass or slag. Moreover, the binders may be formed by cement, lime or a mixture of cement and lime in varying proportions.

These frozen concretes and mortars may be handled and transported in a packing such as bags and containers, so as to be stored for later use.

A first series of resistance tests of a concrete or mortar having been subjected to freezing after manufacture thereof was effected on test cylinders of 4 x 4 x 16 centimetres.

Cement used: CPAL 325, which is an artificial Portland cement comprising 15%±5% of blast furnace slag, said cement presenting a guarantee of minimum resistance of 325 bars at 28 days on mortar 150.

Sand used: AFNOR, a French standard corresponding to the international standard 150 for sand.

Freezing was effected immediately after mixing at a temperature of −18° C. and the concrete or mortar was preserved at this temperature for approximately five hours.

The following tables show various relationships between concretes and mortars of different constitution, and their age and resistance, on the running of tests of such frozen materials.

| Composition of mortar or concrete | Age of the concrete after thawing during the test (days) | Resistance to— Compression (kg./cm.²) | Bending (kg./cm.²) |
|---|---|---|---|
| 1,350 g. sand<br>450 g. cement<br>245 g. water | 3 | 120 | 22 |
| 900 g. gravel<br>450 g. sand<br>450 g. cement<br>180 g. water | 7 | 199 | 39 |
| 1,350 g. sand<br>450 g. cement<br>225 g. water | 7 | 183<br>215 | 38,50<br>37 |
| 1,350 g. sand<br>450 g. cement<br>225 g. water | 120 | 459<br>529 | 72<br>76 |

A second series of tests was effected under the following conditions:

| Age of the concrete after thawing during the test (days) | Resistance to— | |
|---|---|---|
| | Compression (kg./cm.²) | Bending (kg./cm.²) |
| 2 | 155 | 30 |
| 2 | 110 | 22 |
| 3 | 125 | 21 |
| 3 | 104 | 13 |
| 7 | 205 | 42 |

Moreover, during the second stage of tests, it was attempted to determine the influence of a possible delay in freezing on the characteristics of the material.

After having proceeded with mixing of the concrete, the latter is left standing for 30 or 60 minutes before effecting the freezing operation.

In order that the invention may be more clearly understood, reference will now be made to the accompanying drawings representing various compression and bending test parameters after differing delays between thawing and testing, at FIGS. 1 to 4.

In the drawings the resistance to pressure or bending are shown in kg./cm.² on the y-axis as a function of the delay in freezing indicated in minutes on the x-axis.

Referring now to the drawings, FIG. 1 shows a graph of resistance to compression of a concrete tested two days after thawing and manufacture of the test pieces.

Figure 1:
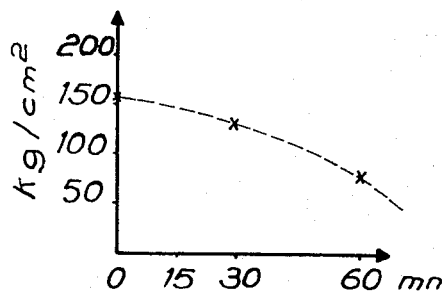
Figure 2:
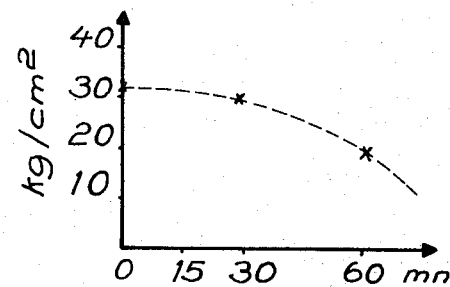
FIG. 2 shows a graph of resistance to bending of a concrete tested two days after thawing and manufacture of the test pieces.
Figure 3:
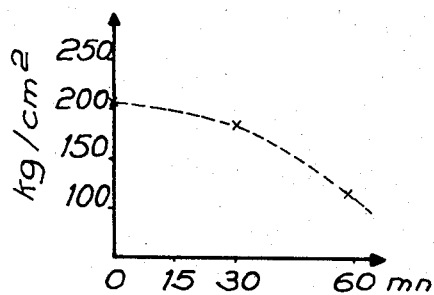
FIG. 3 shows a graph of resistance to compression of a concrete tested seven days after thawing and manufacture of the test pieces.
Figure 4:
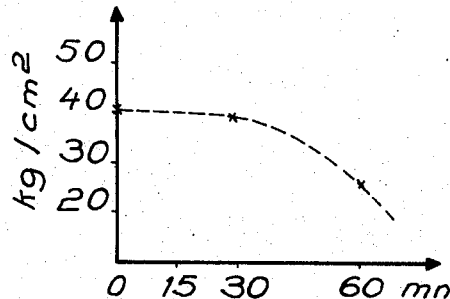
FIG. 4 shows a graph of resistance to bending of a concrete tested seven days after thawing and manufacture of the test piece.

Upon examination of these graphs, it is apparent that the resistance to compression or to bending of the concrete diminishes as the delay in freezing after mixing increases.

This drop in resistance is particularly pronounced from 30 minutes onwards.

Therefore, according to one of the characteristics of the method, it is necessary, in order that the concrete and mortar resistances shall be at least equal to those of a concrete or mortar which is not frozen, to effect freezing before the beginning of hydration of the binder (cement for example) and, preferably after mixing of the binders and aggregates is terminated.

According to the tests effected, it seems that the delay in freezing must not exceed 30 minutes for a temperature equal to or greater than 15° C., at the risk of the resistance of the concrete diminishing.

The freezing of the concrete or mortar may be effected between 0 and —40° C. and more particularly between —8° and —15° C.

Naturally, various modifications may be made by the man skilled in the art to the methods described solely by way of non-limiting examples, without departing from the scope of the invention as defined by the appended claims.

I claim:

1. A method of manufacturing concrete or mortar which comprises:
   (a) preparing a pasty mixture of a binder selected from the group consisting of cement, lime, and a mixture of cement and lime, and aggregate and water;
   (b) subjecting said pasty mixture to a freezing operation between 0° C. and —40° C. thereby freezing the mixture;
   (c) storing or transporting the resultant frozen mixture; and
   (d) subsequently subjecting the frozen mixture to a thawing operation to reconvert said mixture back to a pasty state for use.

2. Method according to claim 1, wherein said freezing operation is effected after said binder and said aggregate are mixed.

3. Method according to claim 1, wherein said freezing operation is effected between —8° C. and —15° C.

4. Method according to claim 1, wherein said aggregate consists of particles of different sizes of materials selected from the group consisting of sand, gravel, expanded clay, pozzolana, expanded polystyrene, glass and slag.

5. Method according to claim 1, wherein said frozen mixture is in the solid state.

References Cited
UNITED STATES PATENTS
| | | | |
|---|---|---|---|
| 870,370 | 11/1907 | Lamson | 264—28 |
| 1,395,990 | 11/1921 | Crawford | 264—28 X |
| 2,846,726 | 8/1958 | Bean | 264—28 X |

OTHER REFERENCES
"Real Cool Concrete," pp. 48 and 50, October 1954, Concrete.

ROBERT F. WHITE, Primary Examiner

T. P. PAVELKO, Assistant Examiner

U.S. Cl. X.R.

264—Dig. 43.